United States Patent [19]
Maehans

[11] 3,814,056
[45] June 4, 1974

[54] APPARATUS FOR REMOVING TEAT CUPS
[75] Inventor: Vaino Maehans, Sodertalje, Sweden
[73] Assignee: Alfa-Laval AB, Tumba, Sweden
[22] Filed: Apr. 16, 1973
[21] Appl. No.: 351,653

[30] Foreign Application Priority Data
May 3, 1972 Sweden.............................. 5784/72

[52] U.S. Cl. .......................................... 119/14.08
[51] Int. Cl. .............................................. A01j 9/08
[58] Field of Search.......... 119/14.08, 14.36, 14.54, 119/14.55, 14.13

[56] References Cited
UNITED STATES PATENTS
3,556,053  1/1971  Padmann et al................. 119/14.08
3,690,300  9/1972  Tonelli........................... 119/14.08

Primary Examiner—Hugh R. Chamblee
Attorney, Agent, or Firm—Cyrus S. Hapgood

[57] ABSTRACT

Upon actuation of a device for pulling the teat cup cluster from the udder, the device opens a normally closed valve to admit air to the interior of the milk claw, whereby milk is flushed from the claw into the milk discharge hose, and the vacuum in the claw is reduced to permit easy removal of the teat cups.

4 Claims, 1 Drawing Figure

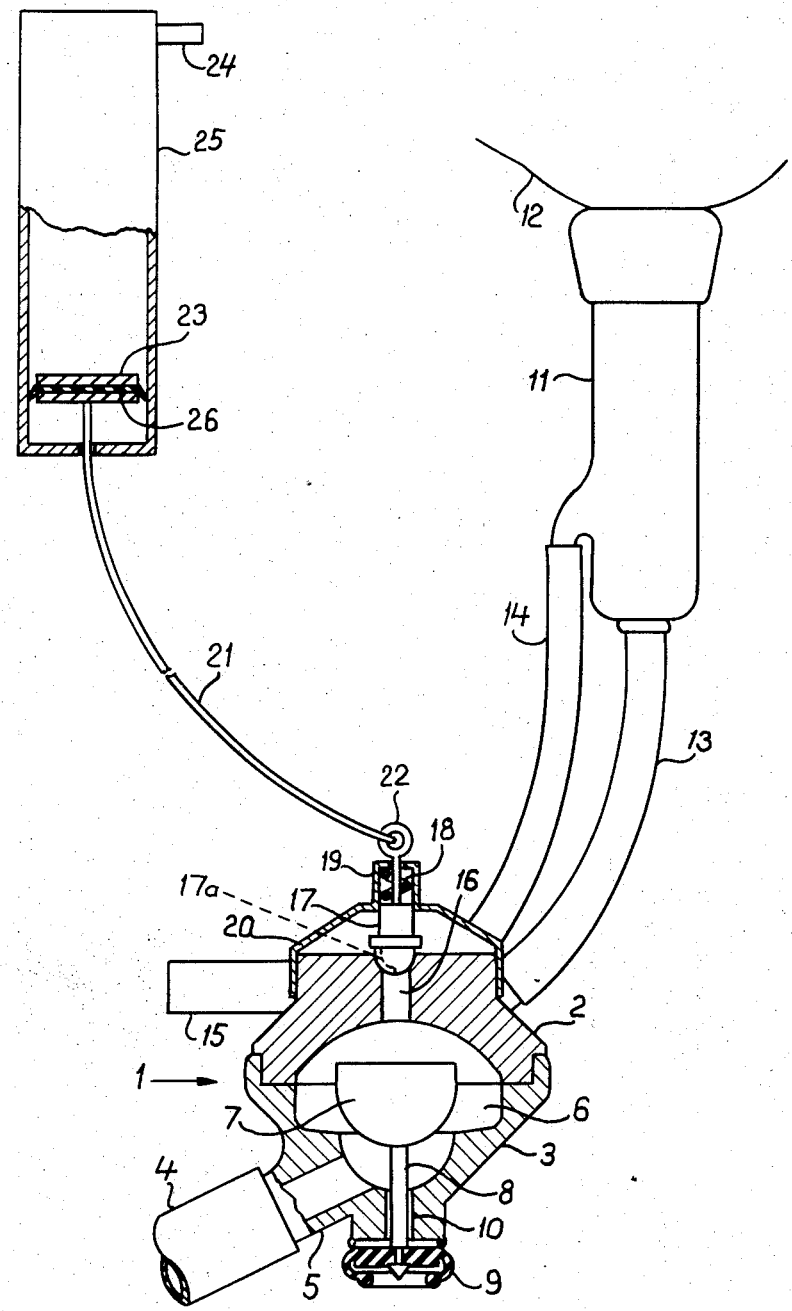

APPARATUS FOR REMOVING TEAT CUPS

The present invention relates to apparatus for pulling a teat cup cluster from an udder.

In a known apparatus of this kind, the teat cups are pulled from the teats while full milking vacuum is still prevailing in the interior of the teat cup liners. Such a removal of the teat cups from the teats injures the latter, and at the same time the milk content of the milk claw and of a certain part of the milk pipeline flows out onto the stall floor. This circumstance is due to the fact that the milk claw, when the teat cup cluster is pulled off while being lifted, is hung vertically, the vacuum connection to the interior of the teat cup liners at the same time being closed.

An object of the present invention is to avoid these disadvantages.

According to the invention, the wire or other pulling means is connected to an air inlet valve inserted in the milk claw, this valve being subjected to a permanent closing force such as vacuum, gravity or a spring force; and when the teat cup cluster is pulled to remove it from the udder, the action of the pulling means opens the air inlet valve against this permanent closing force.

The pulling-off operation can be started manually or automatically, after it has been found that the milk delivery from the udder has been strongly reduced or has ceased. Prior to the pulling-off operation, milking vacuum prevails in the milk claw. When said inlet valve is opened by the pulling effect of the pulling means, air rushes immediately into the milk claw and flushes away the milk, remaining in the milk claw and the milk pipeline, to the milk collection place. Thus, the vacuum is reduced in the milk claw so that the teat cups loosen from the teats. The flushing-away of the milk takes place so rapidly that when the teat cups are pulled from the teats, substantially all milk has been flushed away, thereby avoiding the flow of milk down onto the stall floor. Consequently, the advantage of the invention is to be seen in this chronological sequence of events when pulling off the teat cup cluster.

As is known, milk claws normally have a small, permanently open air inlet hole, whereby air entering through the hole will serve as a medium for conveying the milk in the milk pipeline. This hole must be cleaned from time to time so that it is not clogged. According to the invention, it is now possible to provide an air inlet hole which is easier to clean than the air inlet holes commonly used heretofore; and this is accomplished by providing a groove in the surface of the valve seat or the valve body. Thus, this groove is readily accessible for cleaning when the valve is disassembled.

According to the invention, the pair inlet valve may be located in the top part of the milk claw. In this way, the air entering through the valve is prevented from bubbling through milk in the milk claw and thereby generating an undesirable milk foam.

The invention is described more in detail below, reference being made to the accompanying drawing in which the single illustration is an elevational view, partly in section, of an example of the new apparatus.

In the drawing, a milk claw 1 comprises a top part 2 and a bottom part 3. A milk hose 4, being under vacuum and drawn onto a nipple 5, is connected to the bottom part. The inlet to nipple 5 can be closed by a valve body 7 when the vacuum decreases in the interior 6 of the milk claw. When full milking vacuum prevails in the chamber 6, the valve body 7 is held in its upward position (as illustrated) by means of a valve spindle 8 and a rubber disc 9 fixed to the lower end of the said spindle and urged upwardly by the atmospheric pressure, the disc thereby closing a channel 10 through which the spindle 8 can move with a certain play.

In the drawing there is shown one of the usual four teat cups 11 which, while the milking is in progress, are fixed to an udder 12. The milk hose 13 of the teat cup opens into the interior 6 of the milk claw, and the pulsation hose 14 of the teat cup is connected through a channel (not shown) in the milk claw to a nipple 15, the latter being connected in the usual manner to a hose leading from the pneumatic pulsator (not shown).

In the part 2 there is an air inlet channel 16, which is closed by a valve body 17 under the influence of vacuum, gravity and a spring 18. The latter is inserted in a cylindrical part 19 at the top of a valve housing 20 secured to the milk claw. The valve body 17 can slide up and down in the cylinder 19 and can be pulled upward by a wire 21, one end of which is fixed to a rod 22 provided with a loop and connected to the valve body 17. The wire 21 is fixed at its other end to a piston 23 in a cylinder 25, partly shown in section and provided with a vacuum connection 24. The piston 23 is provided with a gasket 26 which serves to seal against the inside of the cylinder.

When the milk flow ceases, the vacuum connection 24 is connected to a vacuum source. This connection may be effected manually but is preferably effected automatically in response to a signal from a milk flow indicator (not shown). The piston 23 is then sucked upward and lifts the valve body 17 against the action of the different closing forces. Atmospheric air rushes into the milk claw through the channel 16 and immediately flushes away milk remaining in the milk claw and the hose 4. The vacuum is thus reduced appreciably, with the result that the teat cups easily loosen from the teats. While the piston 23 continues moving relatively slowly upward, the teat cups are pulled off gently. When all of the four teat cups have been removed from the teats, air also rushes into the milk claw through the teat cups and the hoses 13, so that the vacuum in chamber 6 is almost completely reduced. The vacuum in milk hose 4 then sucks valve body 7 rapidly against the inlet of the nipple 5 and shuts off the milk hose 4 from additional admission of air, and the piston 23 moves to its top position while lifting the milk claw.

As shown, the valve body 17 is provided in the surface of its lower part with a groove 17a forming a small but permanently open inlet which admits air to the claw chamber 6, for the purpose previously mentioned. The valve housing 20, of course, is suitably ported for free flow of atmospheric air to the interior of this housing.

I claim:

1. In combination with a teat cup cluster including a milk claw having a chamber adapted for connection to a vacuum source for drawing milk from the teat cups by way of said chamber, apparatus for pulling the teat cup cluster from an udder and comprising an air inlet valve body biased to a substantially closed position and movable to an open position for admitting a substantial flow of air to the claw chamber, and means associated with said cluster and operable to exert a pulling action to remove the cluster from the udder, said means including a member operatively connected to the inlet valve body for moving the same to said open position in response to said pulling action.

2. The combination of claim 1, in which the milk claw has a valve seat against which said inlet valve body is biased, one of said seat and body having a groove forming a permanently open inlet for admitting a relatively small flow of air to the claw chamber.

3. The combination of claim 1, in which said inlet valve body is located at the upper part of the milk claw.

4. The combination of claim 1, in which said member is connected to the milk claw through the inlet valve body and is subjected to said pulling action for pulling the valve body to its said open position and then pulling the teat cup cluster from the udder.

* * * * *